(12) United States Patent
Manohar et al.

(10) Patent No.: US 9,191,554 B1
(45) Date of Patent: Nov. 17, 2015

(54) CREATING AN ELECTRONIC BOOK USING VIDEO-BASED INPUT

(71) Applicant: Amazon Technologies, Inc., Reno, NV (US)

(72) Inventors: Vasant Manohar, Tamil Nadu (IN); Sridhar Godavarthy, Tamil Nadu (IN); Viswanath Sankaranarayanan, Tamil Nadu (IN)

(73) Assignee: Amazon Technologies, Inc., Seattle, WA (US)

( * ) Notice: Subject to any disclaimer, the term of this patent is extended or adjusted under 35 U.S.C. 154(b) by 409 days.

(21) Appl. No.: 13/677,096

(22) Filed: Nov. 14, 2012

(51) Int. Cl.
*G06F 17/00* (2006.01)
*H04N 5/14* (2006.01)
*G06F 17/21* (2006.01)

(52) U.S. Cl.
CPC . *H04N 5/14* (2013.01); *G06F 17/21* (2013.01)

(58) Field of Classification Search
None
See application file for complete search history.

(56) References Cited

U.S. PATENT DOCUMENTS

| | | | | |
|---|---|---|---|---|
| 6,115,482 | A * | 9/2000 | Sears et al. | 382/114 |
| 2005/0196043 | A1* | 9/2005 | Jung et al. | 382/176 |
| 2007/0230748 | A1* | 10/2007 | Foss | 382/114 |
| 2007/0288971 | A1* | 12/2007 | Cragun et al. | 725/90 |
| 2010/0246961 | A1* | 9/2010 | Prasad et al. | 382/181 |
| 2010/0296138 | A1* | 11/2010 | Jakes et al. | 358/494 |
| 2013/0242054 | A1* | 9/2013 | Chiu et al. | 348/46 |
| 2013/0314593 | A1* | 11/2013 | Reznik et al. | 348/373 |

OTHER PUBLICATIONS

Konuskan, "Visual Saliency and Biological Inspired Text Detection," Sep. 15, 2008, 84 pages.
Mancas-Thillou et al., "An Introduction to Super-Resolution Text," 2007, 21 pages.
Manohar et al., "Graph Clustering-based Ensemble Method for Handwritten Text Line Segmentation," Nov. 3, 2011, 5 pages.
Solanki et al., "Texture Segmentation Using Optimal Gabor Filter," May 16, 2011, 39 pages.

\* cited by examiner

*Primary Examiner* — Keith Bloomquist
(74) *Attorney, Agent, or Firm* — Lee & Hayes, PLLC; Shivshanker S. Niampally

(57) ABSTRACT

Some implementations include using a trained classifier to identify page-turn events in a video. The video may be divided into multiple segments based on the page-turn events, with each segment of the multiple segments corresponding to a pair of adjacent pages in a book. Exemplar frames that provide non-redundant data compared to other frames may be chosen from each segment. The exemplar frames may be cropped to include content portions of pages. The exemplar frames may be aligned such that a pixel is located in a same position in each frame. Optical character recognition (OCR) may be performed on exemplar frames and the OCR for exemplar frames in each segment may be combined. The exemplar frames in each segment may be combined to create a composite image for each pair of adjacent pages in the book, and OCR may be performed on the composite image.

20 Claims, 9 Drawing Sheets

CREATING AN ELECTRONIC BOOK USING VIDEO-BASED INPUT

BACKGROUND

Many books published prior to the adoption of digital publishing may be available only in a paper-based format. A corresponding digital version of such books may not exist, making these books unavailable to individuals who use electronic book (eBook) readers. To create a digital (e.g., eBook) version of books that are only available in paper-based format, the books may be scanned, page-by-page, using a flatbed scanner. However, scanning books page-by-page using a flatbed scanner may be impractical, cumbersome, and/or time consuming. For example, large hardbound books may be difficult to open sufficiently to allow scanning pages using a flatbed scanner. As another example, attempting to use a flatbed scanner to scan documents that are fragile or deteriorating, such as historical documents, may further damage such documents.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
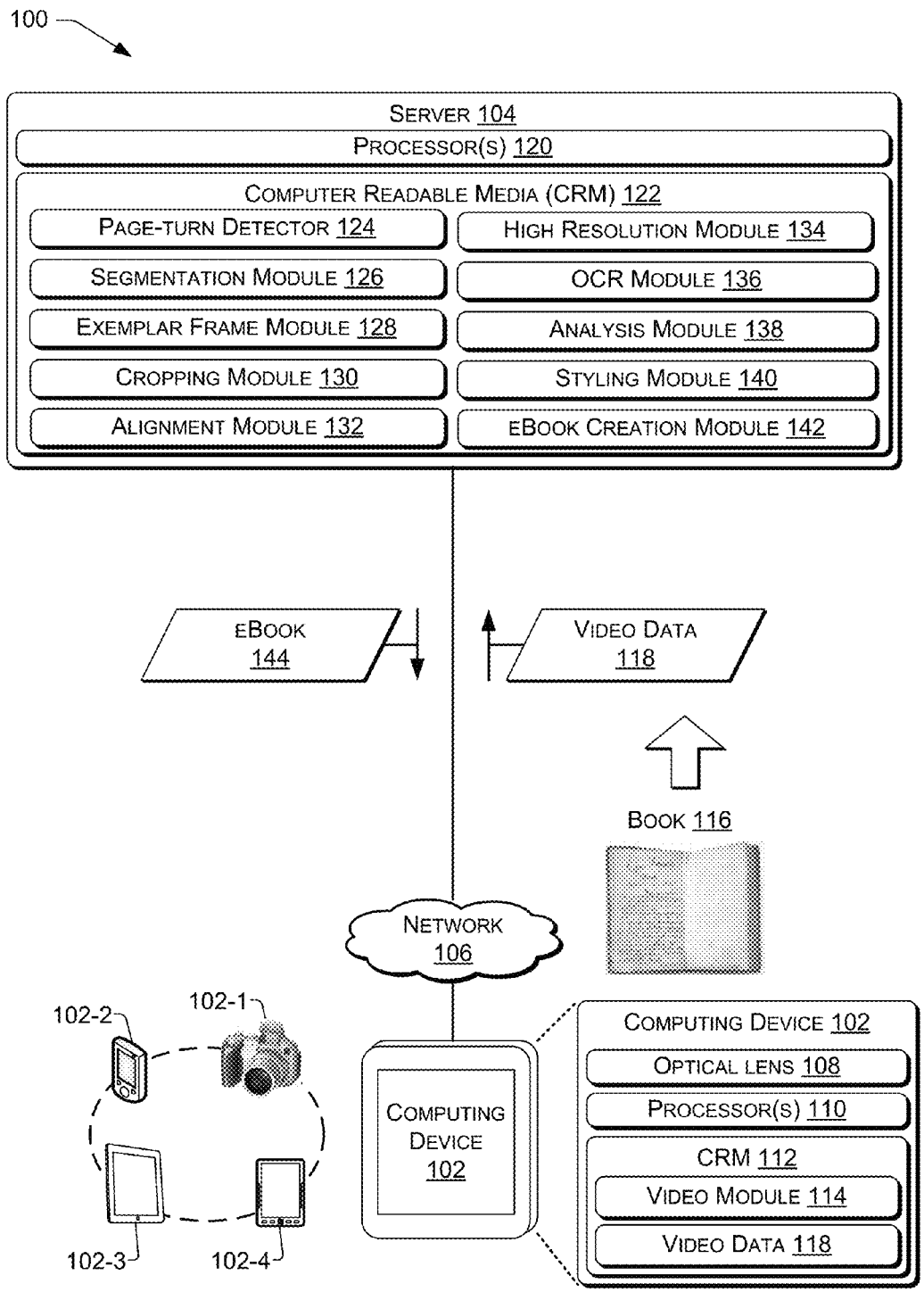
FIG. 1 is an illustrative architecture that includes creating video data that includes pages in a book being turned according to some implementations.

The systems and techniques described herein may be used to create an electronic book (eBook) based on a video of pages of a paper-based book being turned. A page-turn detector that is trained using machine-learning techniques may be used to identify frames of the video in which a page-turn event occurs (e.g., frames in which a page of the book is being turned). The video may be divided into multiple segments based on the page-turn events, such that each segment corresponds to a pair of adjacent pages in the book. Exemplar frames may be identified in each segment of the multiple segments. An exemplar frame may be a frame in a particular segment that provides a maximum amount of information (e.g., non-redundant information) associated with the corresponding pair of adjacent pages as compared to other frames in the particular segment. In some implementations, the exemplar frames may be cropped to include a content portion while excluding any extraneous content in the corresponding pair of adjacent pages.

In some implementations, the exemplar frames may be aligned such that at least some of the pixels in one exemplar frame are in the same position in other exemplar frames. For example, a pixel at a position (x1, y1) in a first frame may, over the course of the video, move to a position (x2, y2) in one or more subsequent frames (where x1 does not equal x2 and y1 does not equal y2). In this example, the first frame may be aligned such that the pixel in the first frame is at the position (x2, y2) or the one or more subsequent frames may be aligned such that the pixel in the one or more subsequent frames is at the position (x1, y1). The exemplar frames in each segment may be combined to create a high-resolution image corresponding to each pair of adjacent pages in the book. Optical character recognition (OCR) may be performed on the high-resolution image to create OCR content for each pair of adjacent pages in the book. OCR may be performed on each of the exemplar frames in each segment and the resulting OCR may be combined to create OCR content for each pair of adjacent pages in the book. After generating OCR content associated with each page in the book, the OCR content may be analyzed to determine a physical structure and a logical structure (e.g., paragraphs, chapters, chapter headings, footnotes, page numbers, and the like). The OCR content may be formatted based on the physical structure and the logical structure. Finally, an eBook may be created based on the formatted content.

Thus, a user may take a video in which pages of a book are being turned and send the video to a server. For example, the user may take the video using a computing device that is capable of taking videos, such as a camera, a camcorder, a cell phone, a tablet computing device, an eBook reader, and the like. The server may convert the video into an eBook suitable for display on a computing device that is capable of displaying eBooks, such as an eBook reader device.

Illustrative Architectures

FIG. 1 is an illustrative architecture that includes creating video data that includes pages in a book being turned according to some implementations. The architecture 100 may include a computing device 102 coupled to a sever 104 via a network 106. The network 106 may include wired networks (e.g., Ethernet, optical, digital subscriber line (DSL), Data Over Cable Service Interface Specification (DOCSIS), and the like), wireless networks (e.g., code division multiple access (CDMA), global system for mobile (GSM), long term evolution (LTE), WiFi (802.11), and the like), other types of communication networks, or any combination thereof.

The computing device 102 may include an optical lens 108, one or more processors 110, and one or more computer-readable media (CRM) 112. For example, the computing device 102 may be a camcorder or camera (e.g., 102-1), a mobile phone (e.g., 102-2), a tablet computing device (e.g., 102-3), an eBook reader (e.g., 102-4), or other type of computing device. The computer-readable media 112 may include a video module 114 that is capable of using the optical lens 108 to create videos (e.g., video data). For example, the video module 114 may use the optical lens 108 to capture pages of a book 116 being turned to create video data 118. The video data 118 may include multiple frames. For example, the video data 118 may be shot at a speed of 15 frames per second (fps), 30 fps, 60 fps, or another frame rate. The video data 118 may include frames in which the optical lens has been zoomed in or zoomed out, such that each frame of the video data 118 includes at least a portion of each page of the book 116. In some cases, each frame may include up to two adjacent pages of the book 116 that are simultaneously displayed. As discussed herein, a page in a book may refer to two adjacent pages of the book 116 that are simultaneously displayed when the book is laid open on a flat surface. The computing device 102 may send the video data 118 to the server with instructions to convert the video data 118 into a corresponding digital representation, such as an eBook.

The server 104 may include one or more processors 120 and one or more computer-readable media 122. The computer-readable media 122 may be used to store instructions that are executable by the processors 120. The instructions may be organized in the form of modules, with each module providing specific functionality. For example, the computer-readable media 122 may include a page-turn detector 124, a segmentation module 126, an exemplar frame module 128, a cropping module 130, an alignment module 132, a high resolution module 134, an optical character recognition (OCR) module 136, an analysis module 138, a styling module 140, and an e-book creation module 142.

The page-turn detector 124 may be a trained classifier that uses machine learning to detect page-turn events in the video data 118. The segmentation module 126 may segment the video data 118 into multiple segments based on the page-turn events. For example, the segmentation module 126 may divide the multiple frames in the video data 118 into multiple segments, with each segment corresponding to a page in the book 116. The exemplar frame module 128 may select exemplar frames from each segment. An exemplar frame in a segment may include a maximum amount of information (e.g., non-redundant information) associated with a particular page of the book 116 as compared to other frames in the segment. Thus, the exemplar frame may include data that other frames in a particular segment do not provide. For example, frame 1 may include 20% data of two adjacent pages, frame 2 may include 60% data, frame 3 may include 65% data, and frame 4 may include 65.5% data. Assuming that the amount of data in each frame is fully inclusive, that is frame 2 includes the 20% data of frame 1, frame 3 includes the 60% data of frame 2, and frame 4 includes the 65% data of frame 3, then frame 4 may be selected as the exemplar frame. However, in some cases, the amount of data may only be partially inclusive. For example, the 60% data in frame 2 may include a portion of the 20% data from frame 1 as well as other portions of the page that frame 1 does not include, the 65% data in frame 3 may include a portion of the 60% data from frame 2 as well as other portions of the page that frame 2 does not include, and the 65.5% data in frame 4 may include a portion of the 65% data from frame 3 as well as other portions of the page that frame 3 does not include. This type of situation may arise under various conditions, such as when zooming in and out, flipping pages (e.g., the bottom of a page may be stationary while the top of the page is in motion and therefore blurred in a frame), based on lighting and shadows (e.g., a first page being flipped may cast a shadow on a portion of a second page, thereby obscuring the portion of the second page). In this example, all four frames (e.g., frames 1, 2, 3, and 4) may be selected as exemplar frames because each provides non-redundant data relative to the other frames. Of course, in some scenarios, some frames may be fully inclusive while other frames may be partially inclusive. For example, assuming frame 2 includes the 20% data of frame 1 and frame 4 includes the 65% data of frame 3 but not all of the 60% data of frame 2, both frame 2 and frame 4 may be selected as exemplar frames. Of course, exemplar frames may be selected using other techniques as well. For example, a predetermined threshold may be used and frames which include an amount of data that exceeds the predetermined threshold may be selected as exemplar frames. As another example, a rolling threshold may be used, in which frames are compared with each other and frames that provide data not provided by other frames are selected as exemplar frames. To illustrate, in each segment, a first frame may be compared to a second frame. If the first frame provides at least some data that the second frame does not provide, then the first frame may be compared against other frames while the second frame may be discarded. This process may be repeated until a subset of frames (e.g., frames that were not discarded) from the segment remain and the subset of frames may be selected as the exemplar frames.

The cropping module 130 may crop one or more of the exemplar frames to include a content portion of the corresponding page(s) while excluding any extraneous content. The alignment module 132 may align an exemplar frame with one or more other exemplar frames such that if a pixel at a particular position in the exemplar frame is in the same particular position in the one or more other exemplar frames. For example, a pixel at a position (x1, y1) in a first frame may, over the course of the video, move to another position (x2, y2) in one or more subsequent frames (where x1 is not equally to x2 and y1 is not equal to y2). In this example, the first frame may be aligned such that the pixel in the first frame is at the location (x2, y2) or the one or more subsequent frames may be aligned such that the pixel is at the location (x1, y1) in the one or more subsequent frames. For example, salient point detection (e.g., a trained classifier similar to the page-turn detector) may be used to detect corners, textured regions and the like. These salient points may then be tracked from a frame to subsequent frames and used to align the frames. As another example, optical flow techniques, such as Lucas-Kanade, may be used to track salient points frame to frame and used to align the frames. In addition, if portions of the video data include one or more of zooming-in, zooming-out, or rotation, patterns of motion vectors may be identified. Frames in the video data that include one or more of zooming-in, zooming-out, or rotation may be independently processed and merged back to relevant word hypotheses using an inverse extrinsic parameter matrix. In response to determining the movement of one or more pixels in one or more frames, the alignment module 132 may align at least a portion of the exemplar frames associated with the video data 118. For example, the alignment module 132 may align exemplar frames within each segment but may not align exemplar frames that belong to different segments. However, in some cases, the alignment module 132 may align exemplar frames without regard to the segments to which each exemplar frame belongs.

To perform optical character recognition on the exemplar frames, various techniques may be used. In one technique, the high resolution module 134 may combine multiple exemplar frames in a segment that corresponds to a page (e.g., pair of adjacent pages) in the book 116 to create a composite (e.g., a relatively high-resolution image as compared to the individual frames) for the corresponding page. The OCR module 136 may perform several functions, including optical character recognition and combining optical character recognition results from multiple images. The OCR module 136 may perform optical character recognition on the high-resolution image (e.g., composite) produced by the high resolution module 134 to create OCR content corresponding to each page (e.g., pair of adjacent pages). In another technique, the OCR module 136 may perform optical character recognition on each exemplar frame in each segment and combine the optical character recognition results to create OCR content corresponding to each page (e.g., pair of adjacent pages). For example, the OCR module 136 may be unable to identify one or more words in an exemplar frame because the words are not included in a dictionary that is maintained by the OCR module 136. A word that the OCR module 136 is unable to identify (e.g., because the word is not included in a dictionary) may be referred to as a suspect word. As another example, a character that the OCR module 136 is unable to identify (e.g., because the character is not included in a character set associated with a particular language) may be referred to as a suspect character. For each suspect word or character in each exemplar frame, the OCR module 136 may determine N hypotheses (N>1) for the suspect word or character. The N hypotheses may be ranked according to a descending likelihood (e.g., probability) that the suspect word or character is the hypothesized word or character. When combining the optical character recognition results for each exemplar frame in a segment, the OCR module 136 may use the ranked hypotheses of each exemplar frame to select a word or character to substitute for the suspect word or character. In some cases, the OCR module 136 (or another module of the server 104) may identify and digitize photographs, illustrations, and other non-text-based content from the book during or after the optical character recognition is performed.

The analysis module 138 may perform physical structure and/or logical structure analysis on the OCR content corresponding to each page to determine various physical and/or logical structures, such as paragraphs, sections, chapters, footnotes, chapter headings, and the like. The styling module 140 may apply various formatting to the OCR content, such as indenting the first line of each paragraph, setting fonts, bolding chapter headings, etc. The e-book creation module 142 may create an e-book 144 using the formatted OCR content and the non-text-based content (e.g., digitized photographs, illustrations, and the like). Therefore, the e-book 144 may be a digital representation of the content of the book 116. The server 104 may send the e-book 144 to the computing device 102 in response to receiving the video data 118.

Thus, the techniques described herein may be used to take a video of pages of a paper-based book being turned. The video may be created by a computing device that has an optical lens, such as a camera, mobile phone, or tablet computing device. The computing device may send the video to a server. The server may convert the video into an eBook and send the eBook to the computing device. In this way, digital representations of paper-based books may be quickly and easily created as compared to other techniques, such as scanning each page of a book using a flatbed scanner.

The computer-readable media 112 and 122 may include memory, such as volatile memory, non-volatile memory, removable memory, and/or non-removable memory, implemented in any method or technology for storage of information, such as computer-readable instructions, data structures, program modules, or other data. Also, the processors 110 and 120 may include onboard memory in addition to or instead of the computer-readable media 112 and 122. Examples of storage media that may be included in the computer-readable media 112 and 122 and/or processors 110 and 120 include, but are not limited to, non-transitory media, such as random access memory (RAM), read only memory (ROM), electrically erasable programmable read only memory (EEPROM), flash memory or other memory technology, compact disk (CD-ROM), digital versatile disks (DVD) or other optical storage, magnetic tape, magnetic disk storage or other magnetic storage devices, or any other medium which can be used to store the desired information and which can be accessed by the processor(s) 110 and 120. Any such computer-readable storage media may be part of the server 104. The computer-readable media 112 and 122 may include software programs or other executable modules that may be executed by the processors 110 and 120, respectively. The computer-readable media 112 and 122 may be used to store device drivers, an operating system, software applications, and the like.

Various processes, instructions, methods and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules can be implemented as software modules that execute on the processor(s) 110 and 120, as hardware, and/or as firmware. Typically, the functionality of the program modules may be combined or distributed as desired in various embodiments. An implementation of these modules and techniques may be stored on or transmitted across some form of computer-readable media.

Furthermore, while FIG. 1 sets forth an example of a suitable architecture to create a digital representation (e.g., eBook) using a video in which pages of a paper-based book are being turned, numerous other possible architectures, frameworks, systems and environments will be apparent to those of skill in the art in view of the disclosure herein.

Figure 2:
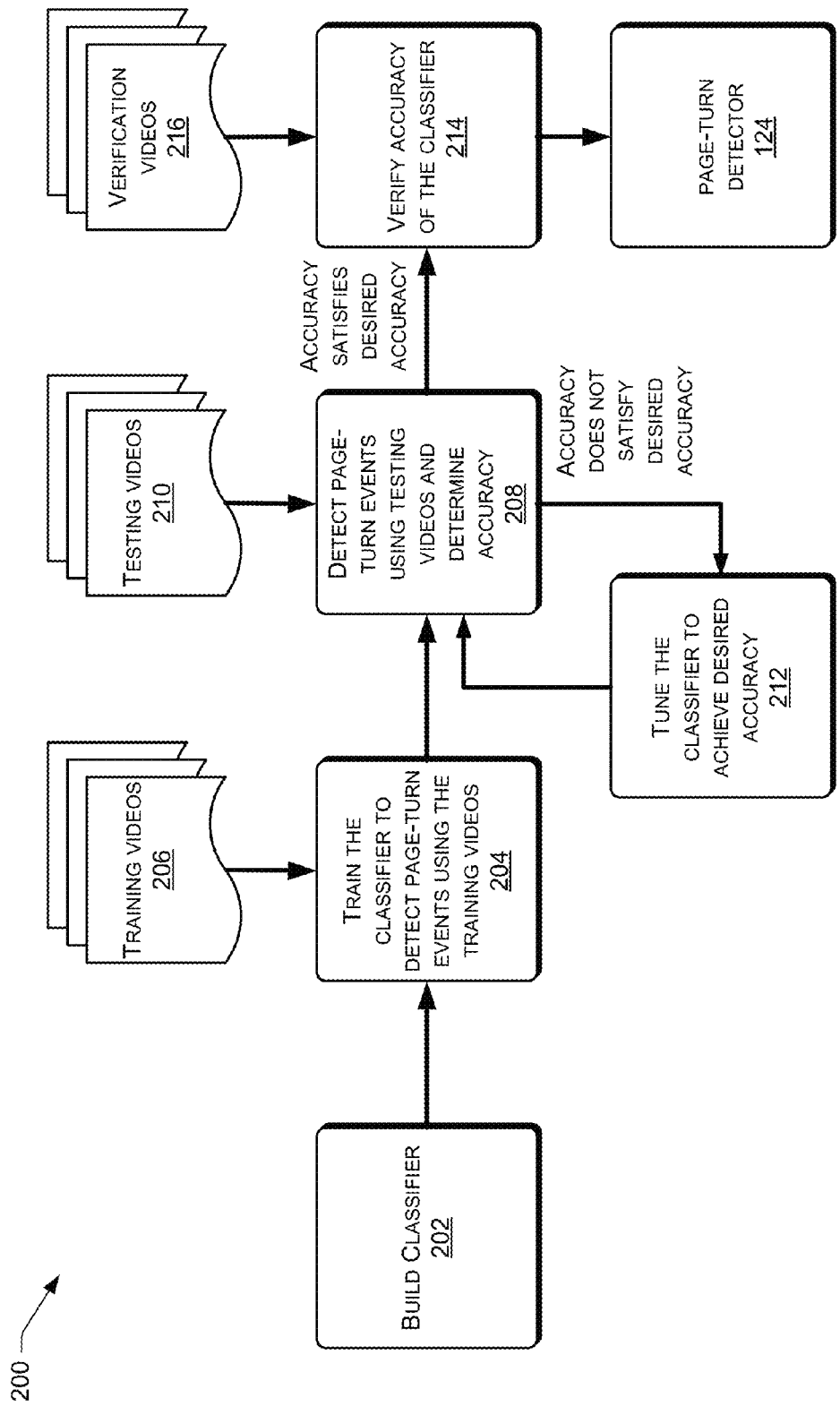
FIG. 2 is an illustrative architecture that includes training a classifier to detect page-turn events according to some implementations.

FIG. 2 is an illustrative architecture 200 that includes training a classifier to detect page-turn events according to some implementations. The architecture 200 illustrates how a classifier may be trained to detect page-turn events to create the page-turn detector 124 of FIG. 1. The page-turn detector 124 may determine a temporal extent of each page in the frames of the video data by detecting occurrences of a specific interest point (e.g., a page-turn event) in the video data.

At 202, a classifier may be built. For example, the classifier may be built using a machine learning algorithm, such as a support vector machine, a neural network, a Bayesian network, or another type of machine learning algorithm. The classifier may be trained to characterize motion vectors (e.g., descriptors) for page-turn events. For example, the classifier may detect low-level motion features, such as space-temporal interest points within a bag-of-words framework.

At 204, the classifier may be trained to detect page-turn events using training videos 206. For example, the training videos 206 may include video data of pages of a paper-based book being turned. In addition, the training videos 206 may identify which frames in the training videos 206 include page-turn events and/or a temporal extent of each page in the frames of the training videos 206. For example, each of the training videos 206 may identify which frames include a page turn event, which frames include a particular page in a book, or both. The classifier may create one or more descriptors that characterize a page turn in time and space. For example, the classifier may view the video data as a three dimensional volume, with x and y being the dimensions of each frame and z (e.g., the third-dimension) being time.

At 208, the classifier may be used to detect page-turn events in one or more testing videos 210. An accuracy of the classifier to detect page-turn events may be determined using the testing videos 210. For example, the testing videos 210 may include video data of pages of a paper-based book being turned. In response to determining, at 208, that the accuracy of the classifier does not satisfy a desired accuracy, at 212, the classifier may be tuned to achieve the desired accuracy and at 208, the classifier may be used to detect page-turn events in the testing videos 210. Detecting page-turn events, at 208, and tuning the classifier, at 212, may be repeated until the accuracy of the classifier satisfies the desired accuracy.

In response to determining that the accuracy of the classifier satisfies the desired accuracy, at 214, the accuracy of the classifier may be verified using one or more verification videos 216. For example, the verification videos 216 may include video data of pages of a paper-based book being turned. Verifying the accuracy of the classifier, at 214, may result in a trained classifier, e.g., the page-turn detector 124.

Thus, using machine learning algorithms, a classifier may be trained to detect page-turn of events in video data to create the page-turn detector 124. By detecting where in the video data the page-turn events occur, frames corresponding to each page in the book may be identified. Identifying page-turn events may enable a temporal extent of each page in the frames of the video data to be determined. The output of the page-turn detector 124 may include a start frame and an end frame for each page-turn event that occurs in the video data.

Figure 3:
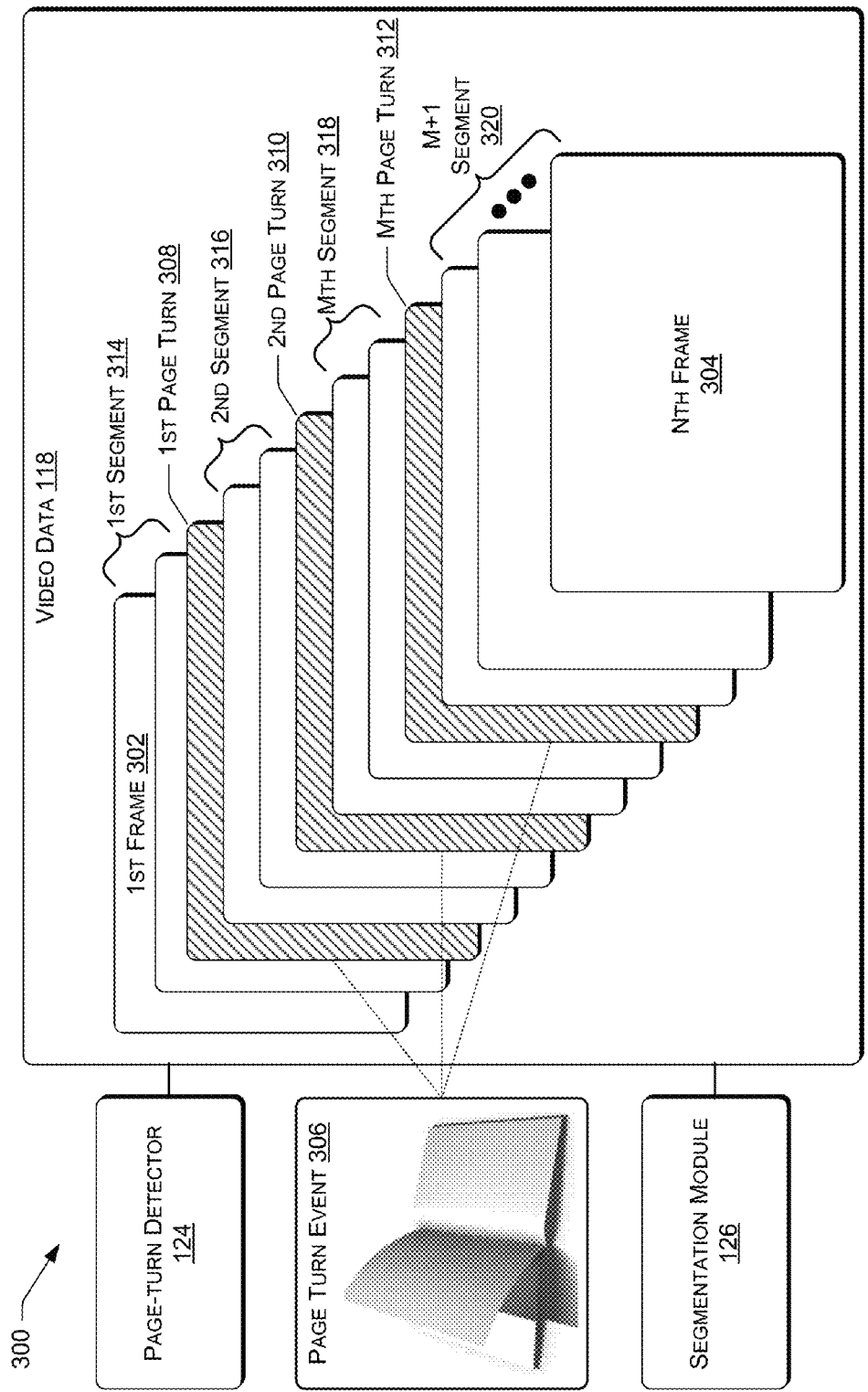
FIG. 3 is an illustrative architecture that includes detecting page-turn events in a video and segmenting the video based on the page-turn events according to some implementations.

FIG. 3 is an illustrative architecture 300 that includes detecting page-turn events in a video and segmenting the video based on the page-turn events according to some implementations. The architecture 300 illustrates how the page-turn detector 124 may be used to detect page-turns in video data and how a segmentation module may, segment the video data based on the detected page-turn events into segments of frames that are associated with each page (e.g., pair of adjacent pages) in a book.

The video data 118 may include N frames (N>1), such as a first frame 302 up to and including an Nth frame 304. The page-turn detector 124 may be used to detect frames in which a page-turn event 306 occurs. For example, the page-turn detector 124 may identify M page-turns in the video data 118, such as a first page-turn 308, a second page-turn 310, up to and including an Mth page-turn 312. While FIG. 3 illustrates each of the page turns 308, 310, and 312 as occupying a single frame, a page turn event may occupy more than one frame of the N frames of the video data 118. The number of frames that include a page turn event may be based on how fast a page turn is performed and a frame rate of the video data 118. For example, if a page turn takes half a second and the video data 118 has a frame rate of 30 frames per second, the page turn may occupy (e.g., be present in) approximately 15 frames.

Based on the M page-turns 308, 310, and 312, the segmentation module 126 may divide the N frames into M+1 segments, with each segment corresponding to at least a portion of a page of a book. At least some of the frames may include two adjacent pages of the book. A frame may include a portion of a page (or of two adjacent pages) if the optical lens was zoomed in when the video was being created. For example, the segmentation module 126 may identify a first segment 314 that starts with the first frame 302 up to and including a frame prior to the first page-turn 308. The segmentation module 126 may identify a second segment 316 that starts with a frame subsequent in time to the first page-turn 308 up to and including a frame prior to the second page-turn 310. The segmentation module 126 may identify an Mth segment 318 that starts with a frame subsequent in time to the second page-turn 310 up to and including a frame prior to the Mth page-turn 312. The segmentation module 126 may identify an M+1 segment 320 that starts with a frame subsequent in time to the Mth page-turn 312 up to and including the Nth frame 304. Each segment of the M+1 segments may include a set of one or more frames.

Thus, the page-turn detector 124 may determine page-turn events in the video data 118. The segmentation module 126 may segment the N frames into segments based on the page-turn events. Each segment may correspond to at least a portion of a page in a book. In some implementations each segment may correspond to two adjacent pages in a book.

Figure 4:
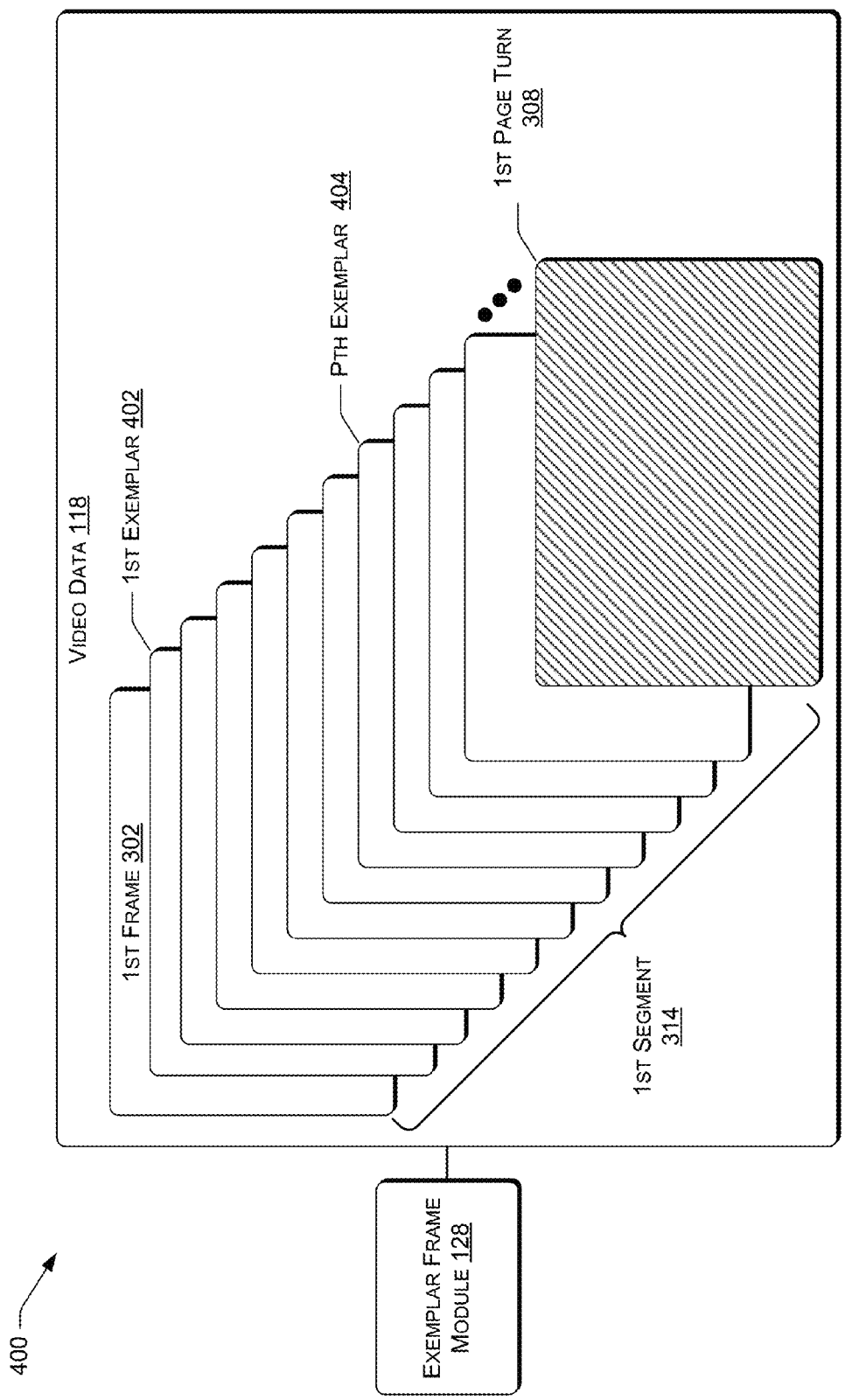
FIG. 4 is an illustrative architecture that includes selecting exemplar frames from a segment according to some implementations.

FIG. 4 is an illustrative architecture 400 that includes selecting exemplar frames from a segment according to some implementations. The exemplar frame module 128 may be used to select exemplar frames from each of the M+1 segments. Each exemplar frame may be provide a maximum amount of data associated with at least a portion of a page (e.g., up to two adjacent pages) in the book as compared to other exemplar frames. Numerous approaches may be taken to selecting exemplar frames. For example, one approach may include selecting a frame at a constant time interval or selecting a frame every N frames (N>1). To illustrate, if the video data includes 30 frames per second, an exemplar frame may be selected every 10 frames (e.g., every ⅓ of a second). As another example, a difference between a frame and a subsequent frame may be determined. If the difference is less than a pre-determined threshold, the frame may be selected as an exemplar frame and the subsequent frame may be discarded. If the difference is greater than or equal to the pre-determined threshold, whichever of the frame or the subsequent frame has the greater amount of information may be selected as an exemplar frame and the other frame may be discarded. This process of comparing a frame with other (e.g., subsequent) frames in each segment may continue until all the exemplar frames for a particular segment have been selected. As yet another example of selecting exemplar frames, more sophisticated techniques may include using an unsupervised learning algorithm (e.g., local linear embedding) combined with k-means clustering.

As illustrated in FIG. 4, the exemplar frame module 128 may identify P exemplar frames (P>0) from the first segment 314, such as a first exemplar 402 up to and including a Pth exemplar frame 404. Each of the P exemplar frames 402 to 404 may be selected because they include data (e.g., information) that is not included in other frames in the first segment 314. For example, the P exemplar frames 402 to 404 may be selected because they include non-redundant data as compared to other frames in the first segment 314. Thus, the P exemplar frames 402 to 404 may contribute data that is not included in other frames in the first segment 314. Similarly, the exemplar frame module 128 may select exemplar frames from each segment of the multiple segments. Each segment may be considered a set of frames and the exemplar frames selected may be considered a subset of each segment.

Selecting exemplar frames from each section may reduce a number of frames on which OCR is to be performed. In addition, each exemplar frame may add information not found in other frames in each section. For example, in a video shot at 30 frames per second in which a page-turn event occurs every second, a hundred page book may result in at least 1500 frames (assuming that approximately 30 frames capture two pages of the book at a time). Selecting exemplar frames may reduce a number of frames that are processed.

Thus, exemplar frames may be chosen from each segment for further processing (e.g., cropping, aligning, OCR, or any combination thereof). Each exemplar frame may contribute information associated with at least a portion of a page in the book that is not provided by other exemplar frames. The exemplar frame module 128 may thus identify distinct frames that provide information that is mutually exclusive (e.g., non-redundant) relative to other frames.

Figure 5:
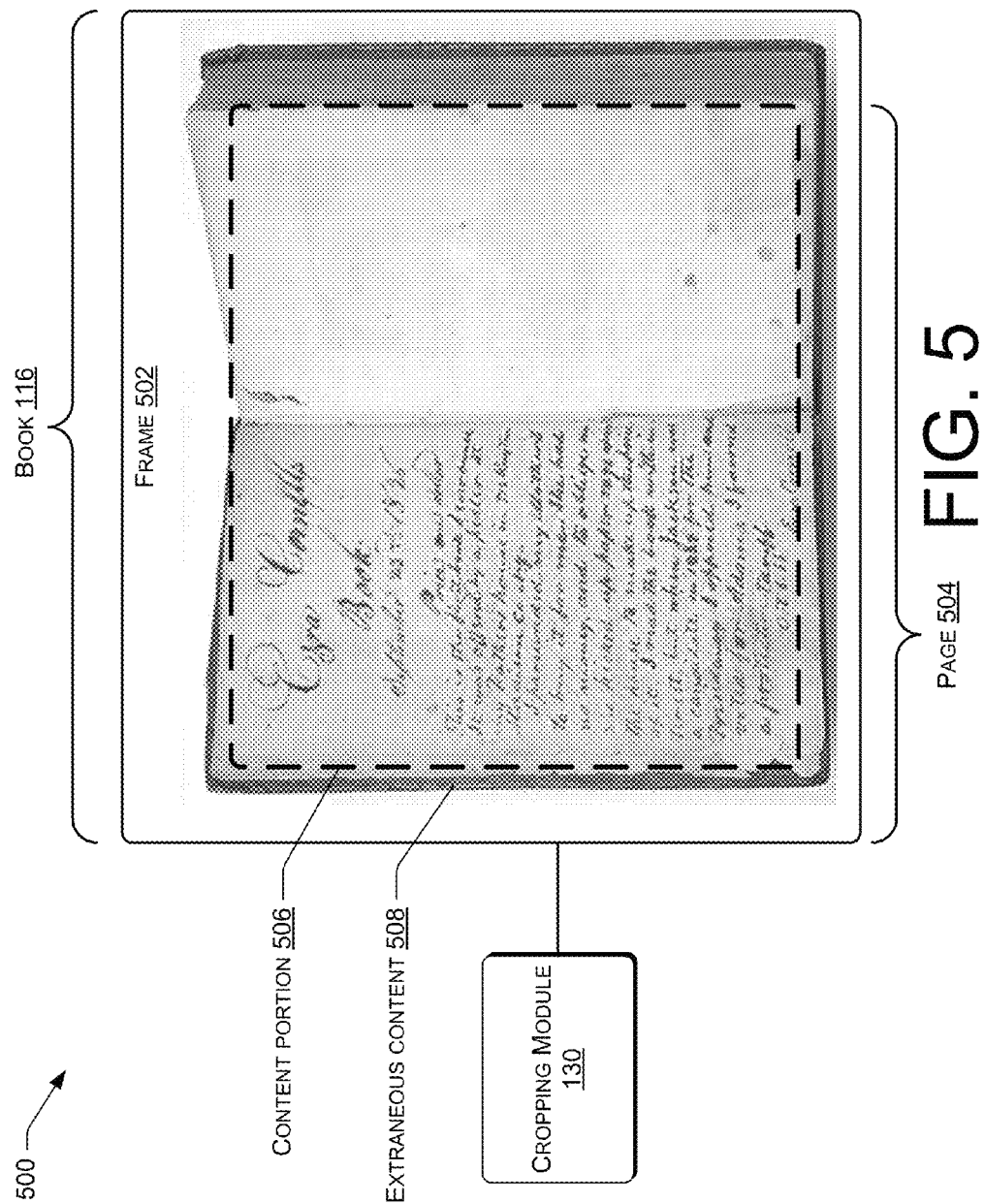
FIG. 5 is an illustrative architecture that includes cropping a frame to include a content portion of a page in a book according to some implementations.

FIG. 5 is an illustrative architecture 500 that includes cropping a frame to include a content portion of a page in a book according to some implementations. The cropping module 130 may analyze one or more frames, such as a representative frame 502, to identify a content portion 506 of a page 504 of the book 116. The cropping module 130 may crop the frame 502 to include the content portion 506 while excluding extraneous content 508. The frame 502 may be one of the N frames 302 to 304. In some cases, the frame 502 may be an exemplar frame.

Various techniques may be used to analyze each frame to identify a content portion of the frame. For example, morphological image processing may be used to identify the content portion of each frame. As another example, text detection may be used that applies morphological operators in a specific (e.g., pre-determined) order. As yet another example, Gabor filters may be used to characterize texture and/or perform text detection.

Thus, the cropping module 130 may crop one or more frames (e.g., exemplar frames) in the video data 118 to include the content portion 506 while excluding the extraneous content 508. The frames may be cropped to more efficiently OCR each page by excluding the extraneous content 508 when performing the OCR. The output of the cropping module 130 is one or more cropped frames that include the content portion 506 while excluding extraneous content 508.

Figure 6:
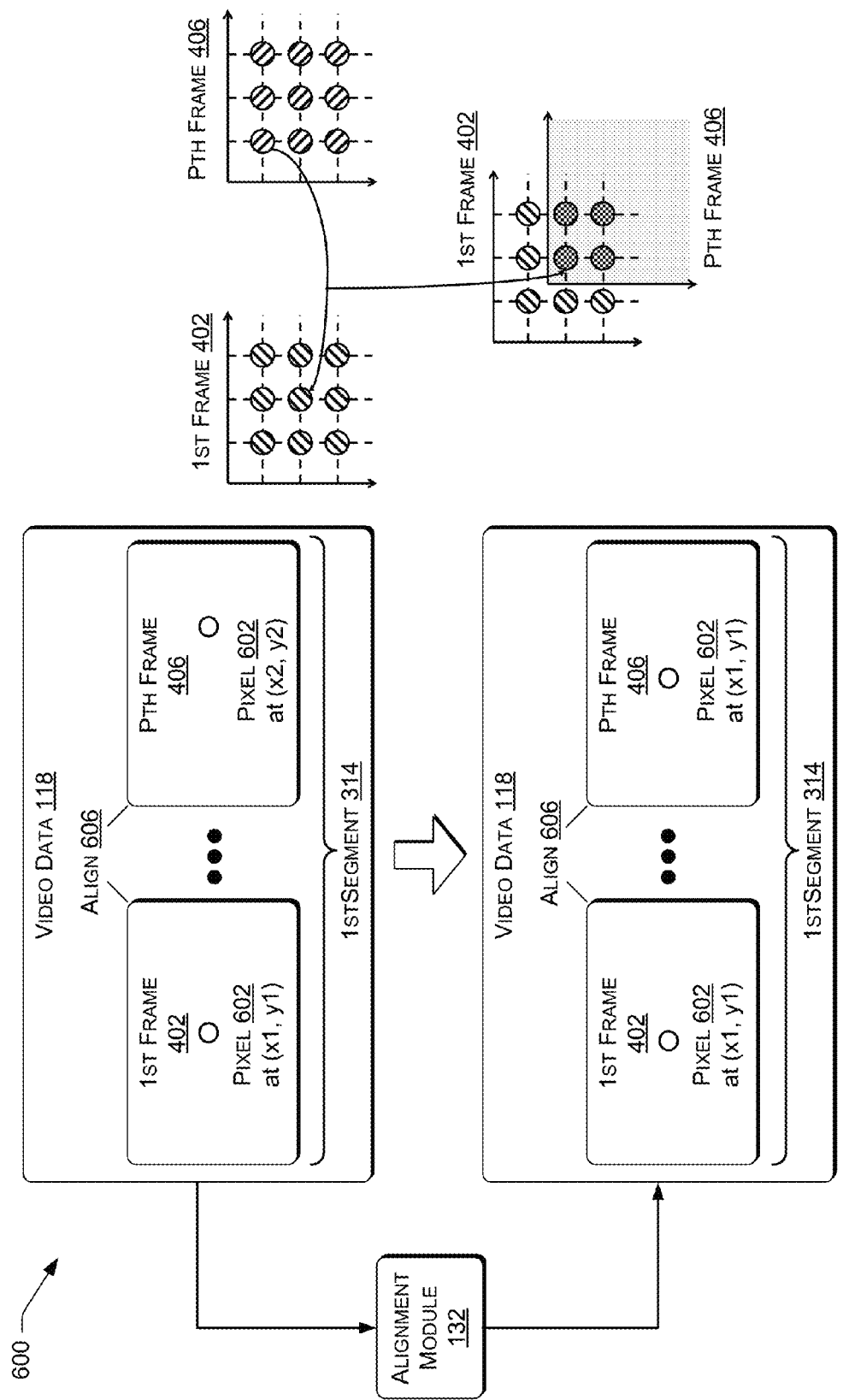
FIG. 6 is an illustrative architecture that includes aligning at least one frame with another frame according to some implementations.

FIG. 6 is an illustrative architecture 600 that includes aligning at least one frame with another frame according to some implementations. The alignment module 132 may determine a location of one or more pixels in a frame (e.g., an exemplar frame) and determine whether the one or more pixels are located in the same location in other frames. If the alignment module 132 determines that the one or more pixels are located in a different location in other frames, the alignment module 132 may perform an alignment such that the one or more pixels are located in the same location in each of the frames. For example, the alignment module 132 may determine that a pixel 602 in the first frame 402 is located at a location (x1, y1). The alignment module 132 may determine that the pixel 602 in the Pth frame 406 is located at a location (x2, y2). In response to determining that the pixel 602 is located at a different location in the Pth frame 406 as compared to the first frame 402, the alignment module 132 may (i) align the first frame 402 such that the pixel 602 is located at the location (x2, y2) or (ii) align the Pth frame 406 such that the pixel 602 is located at the location (x1, y1). Thus, the alignment module 132 may perform motion compensation in terms of the movement of pixels from a frame to subsequent frames.

The alignment module 132 may select one frame to which other frames are to be aligned. For example, if there are M frames in which the pixel 602 is located at the location (x1, y1) and N frames in which the pixel 602 is located at another location (e.g., (x2, y2)) then the alignment module 132 may align the N frames such that the pixel 602 is at the location (x1, y1) if N is less than M and align the M frames such that the pixel 602 is at the location (x2, y2) if M is less than N. If M is equal to N then the alignment module 132 may arbitrarily select a portion of the frames for alignment. In some cases, the alignment module 132 may align all the exemplar frames in the video data 118 with one another. In other cases, the alignment module 132 may align all the exemplar frames in each segment with one another without aligning exemplar frames that are in different segments.

Various techniques may be used to align frames with each other. For example salient point detection (e.g., a trained classifier similar to the page-turn detector) may be used to detect corners, textured regions and the like. These salient points may then be tracked from a frame to subsequent frames and used to align the frames. As another example, optical flow techniques, such as Lucas-Kanade, may be used to track salient points frame to frame and used to align the frames. In addition, if portions of the video data include one or more of zooming-in, zooming-out, or rotation, patterns of motion vectors may be identified. Frames in the video data that include one or more of zooming-in, zooming-out, or rotation may be independently processed and merged back to relevant word hypotheses using an inverse extrinsic parameter matrix.

Thus, the alignment module 132 may align one or more frames in the video data 118 with one another to provide point-to-point conformance, thereby improving an accuracy of the OCR. For example, aligning exemplar frames in each segment may enable the exemplar frames to be combined into a high-resolution image. As another example, aligning exemplar frames in each segment may enable the OCR hypotheses for suspect words to be consistent, thereby improving the accuracy of the OCR. If the video data includes frames in which a zoom-in operation has been performed to capture a portion of a page in one or more frames, the alignment module 132 may map the zoomed in portions to zoomed out frames that include the entire page using motion vectors. The result of aligning the frames may be a point-to-point correspondence between frames (e.g., typically with reference to the first frame).

Figure 7:
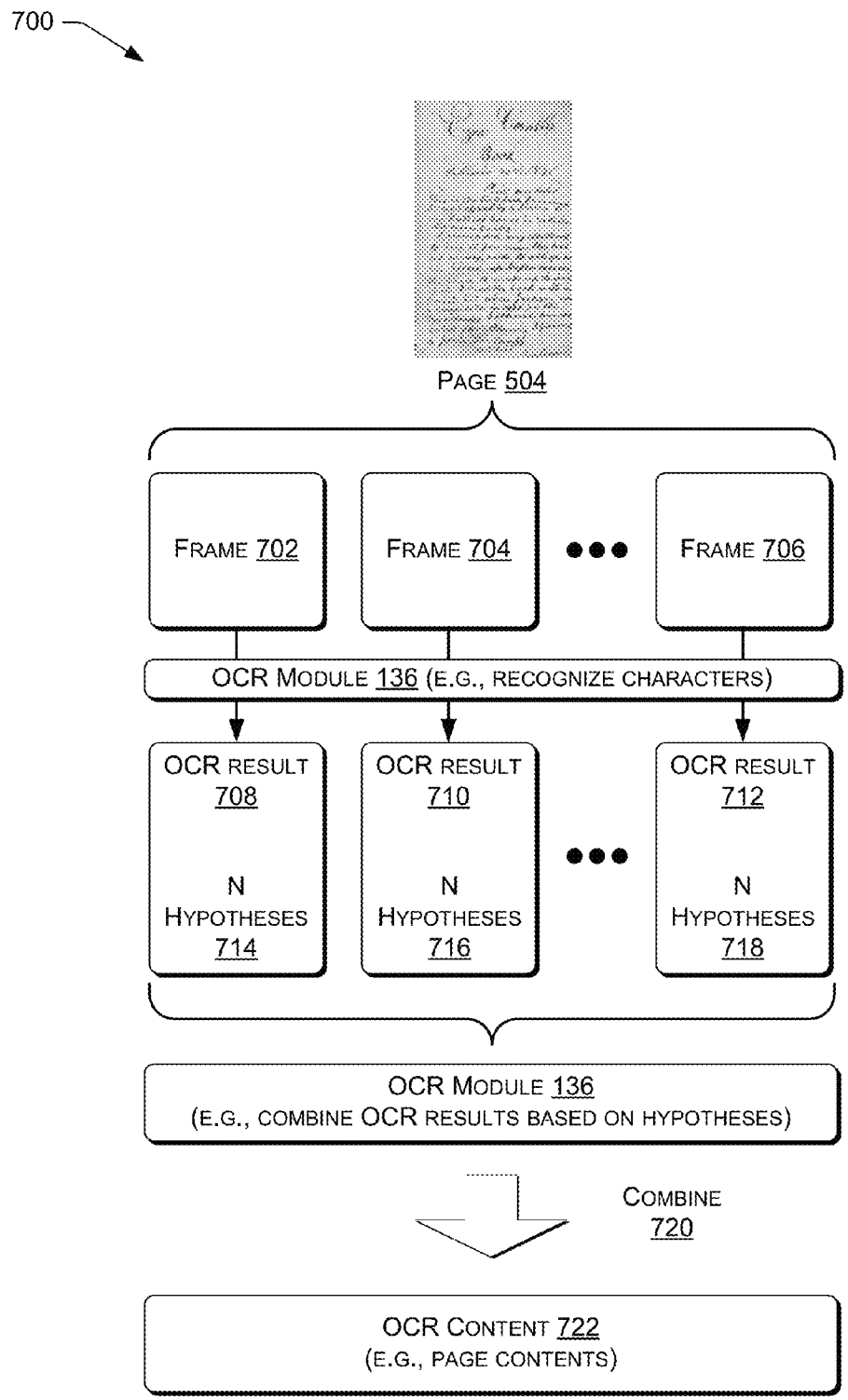
FIG. 7 is an illustrative architecture that includes performing optical character recognition (OCR) on multiple frames and combining the results of the OCR according to some implementations.

FIG. 7 is an illustrative architecture 700 that includes performing optical character recognition (OCR) on multiple frames and combining the results of the OCR according to some implementations. In the architecture 700, the OCR module 136 may be used to perform optical character recognition on multiple frames, such as the frames 702, 704, up to and including the frame 706 that are associated with a particular page (e.g., pair of adjacent pages), such as the representative page 504. The frames 702, 704, and 706 may be included in the N frames 302 to 304 in the video data 118 of FIG. 3. For example, the frames 702, 704, and 706 may be exemplar frames in a segment.

A result of performing optical character recognition on the frame 702 may be OCR result 708, the result of performing character optical character recognition on the frame 704 may be OCR result 710, and the result of performing optical character recognition on the frame 706 may be OCR result 712. The OCR results 708, 710, 712 may each include N hypotheses (N>1) for each suspect word and/or character in the frames 702, 704, 706, respectively. For example, the OCR result 708 may include N hypotheses 714 for each suspect word and/or character in the frame 702. The OCR result 710 may include N hypotheses 716 for each suspect word and/or character in the frame 704. The OCR result 712 may include N hypotheses 718 for each suspect word and/or character in the frame 706. In some cases, each of the N hypotheses 714, 716, and 718 may be ranked in descending order according to a likelihood (e.g., probability) that a hypothesized word (or hypothesized character) corresponds to a suspect word (or suspect character). For example, a hypothesized word or character with a higher probability may be ranked higher than other hypothesized words or characters that have a lower probability.

The OCR module 136 may combine 720 two or more of the OCR results (e.g., the OCR results 708, 710, and 712) to create OCR content 722 that corresponds to the page 504 (e.g., pair of adjacent pages). For example, a word that is suspect in one frame, such as the frame 702, may be recognized by the optical character recognition in another frame, such as the frame 704 or 706. By combining the OCR results 708, 710, and 712, the OCR module 136 may be able to reduce a number of suspect words and resolve any remaining suspect words using the N hypotheses 714, 716, and 718. Thus, the OCR module 136 may correlate hypotheses between different frames that are associated with the same pair of adjacent pages.

Thus, one technique for performing optical character recognition is to perform optical character recognition on each frame (e.g., each exemplar frame) in each segment and then combine the OCR result for each frame in each segment to create OCR content associated with a page (or two pages) in the book. Each OCR result may include hypotheses for each suspect word and/or character in the corresponding frame.

Any suitable type of OCR technology may be used with the implementations herein. As one example, matrix matching (or pattern matching) OCR may be used, which attempts to associate a perceived glyph or character with a stored collection of bitmapped patterns or outlines of characters. When an image of a glyph corresponds to one of the stored bitmaps or patterns within a certain level of confidence, an OCR module may identify that glyph image as the equivalent plain text character. Additionally, or alternatively, in other examples, the OCR herein may include feature extraction and topological feature analysis in which an OCR module searches for common features of a glyph, such as open spaces in a character, closed forms, horizontal lines, vertical lines, curved shapes, intersecting lines, and so forth, to perform pattern recognition based on known features of glyphs.

Figure 8:
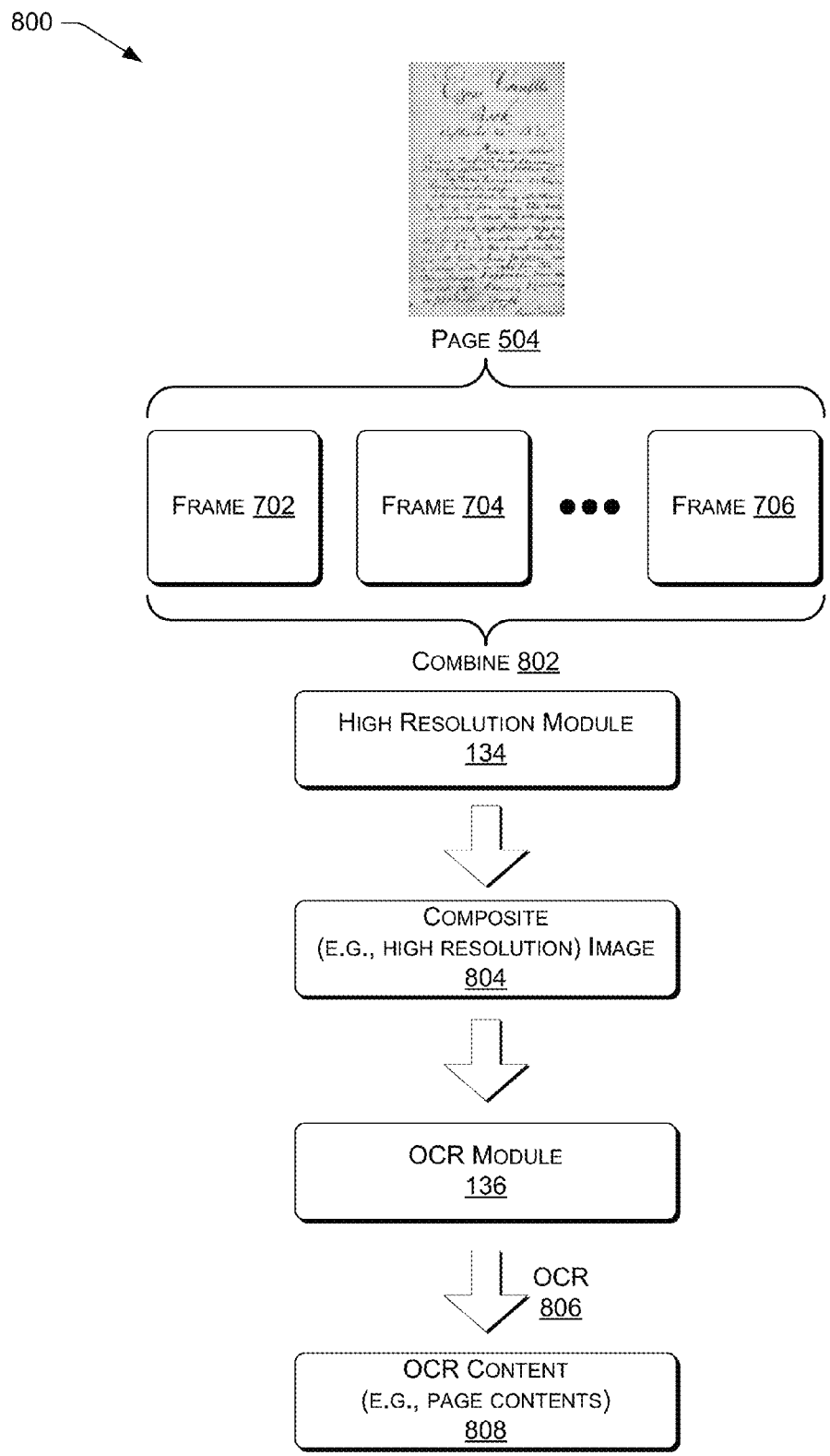
FIG. 8 is an illustrative architecture that includes combining multiple frames to create a high resolution image and performing OCR on the high resolution image according to some implementations.

FIG. 8 is an illustrative architecture 800 that includes combining multiple frames to create a high resolution image and performing OCR on the high resolution image according to some implementations. In the architecture 800, the frames 702, 704, and 706 may be associated with at least a portion of a page in a book, such as the page 504. In some cases, one or more of the frames 702, 704, or 706 may include a pair of adjacent pages in the book. The N frames 302 to 304 in the video data 118 of FIG. 3 may include the frames 702, 704, and 706. For example, the frames 702, 704, and 706 may be exemplar frames in a segment.

The high resolution module 134 may combine 802 frames 702, 704, and 706 to create a high-resolution image 804. The OCR module 136 may perform optical character recognition 806 on the high-resolution image 804 to create OCR content 808 that corresponds to page 504. By creating the high-resolution image 804, the optical character recognition may be more accurate (e.g., fewer suspect words) as compared to performing optical character recognition on each of the frames 702, 704, or 706 individually.

Thus, one technique for performing optical character recognition may be to combine frames that include a same page (e.g., pair of adjacent pages) to create a composite image that includes more data about the page (e.g., pair of adjacent pages) as compared to the individual frames. For example, the frames 702, 704, at 706 may be combined to create the high-resolution image 804 and the OCR module 136 may be used to perform optical character recognition on the high-resolution image 804. The high-resolution image 804 may have a higher resolution than each of the individual frames 702, 704, or 706 that are used to create the high-resolution image 804. For example, the frame 702 may provide image data not found in frames 704 or 706, the frame 704 may provide image data not found in frames 702 or 706, and/or the frame 706 may provide image data not found in frames 702 or 704. To illustrate, for documents, a resolution of 300 dots per inch (dpi) is generally considered satisfactory for OCR, because a text character may occupy up to 40×40 pixels. However, in video frames that have a resolution of 320×240, a text character may occupy no more than 10×10 pixels. Thus, combining the information provided by each individual frame to create the high-resolution image 804 may create a composite image that provides more data when performing OCR.

Constructing the high-resolution image 804 may include motion estimation/registration, warping/reconstruction, and de-blurring/de-noising. Motion estimation may include identifying motion parameters using registration, in which relative translations, rotations and other transformations define an accurate point-to-point correspondence between images in the input sequence. Each frame may be registered to a reference frame, such as the first frame, to enable combining the individual frames to create the high-resolution image during the reconstruction stage.

The techniques described in the architectures 700 and 800 may, in some implementations, be used together. For example, if performing OCR on each exemplar frame (e.g., as described in FIG. 7) yields more than a threshold number of suspect words, the exemplar frames may be combined to create a high resolution image and OCR may be performed on the high resolution image (e.g., as described in FIG. 8). As another example, if there are more than a threshold number of exemplar frames in a segment, the exemplar frames may be combined to create a high resolution image and OCR may be performed on the high resolution image (e.g., as described in FIG. 8) to reduce the number of frames on which OCR is performed. In this example, if there are no more than the threshold number of exemplar frames in a segment, OCR may be performed on each exemplar frame (e.g., as described in FIG. 7).

Example Process

Figure 9:
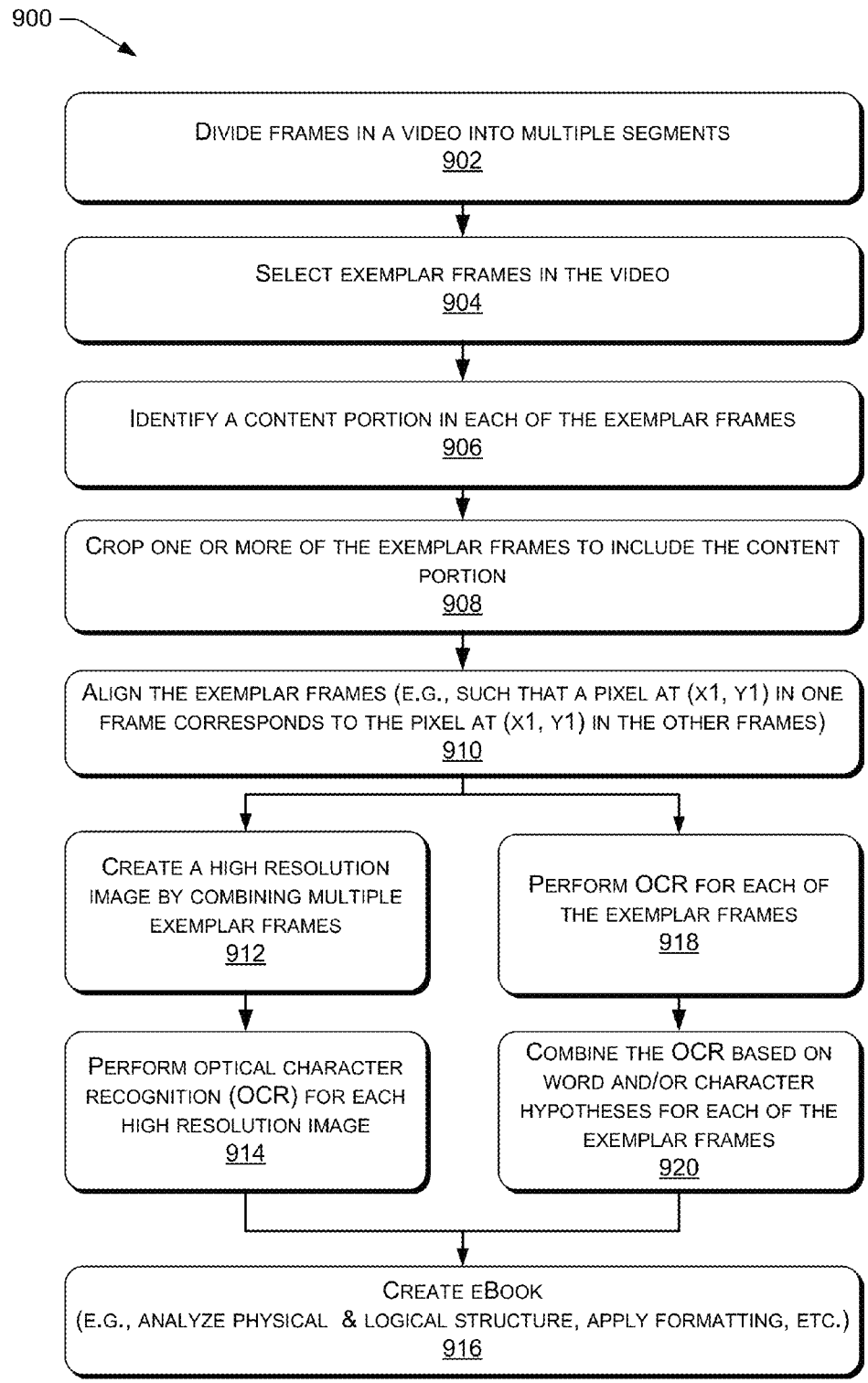
FIG. 9 is a flow diagram of an example process that includes creating an electronic book (eBook) based on video data according to some implementations.

In the flow diagram of FIG. 9, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process 900 is described with reference to the architectures 100, 200, 300, 400, 500, 600, 700, and 800 as described above, although other models, frameworks, systems and environments may implement these processes.

FIG. 9 is a flow diagram of an example process 900 that includes creating an electronic book (eBook) based on video data according to some implementations. The process 900 may be performed by the server 104 of FIG. 1.

At 902, frames in a video may be divided into multiple segments. For example, in FIG. 3, the page-turn detector 124 may be used to identify page-turn events in the video data 118. The segmentation module 126 may segment the frames 302 to 304 into multiple segments based on the page-turn events, with each segment corresponding to a page (e.g., two adjacent pages) in the book.

At 904, exemplar frames may be selected in the video. For example, in FIG. 4, the exemplar frame module 128 may identify exemplar frames in each segment of the video data 118, such as the P exemplar frames 402 to 404 in the first segment 314.

At 906, a content portion in each of the exemplar frames may be identified. At 908, one or more of the exemplar frames may be cropped to include the content portion. For example, in FIG. 5, the cropping module 130 may identify, in each exemplar frame, the content portion 506. The cropping module 130 may crop each exemplar frame to include the content portion 506 and to exclude the extraneous content 508.

At 910, the exemplar frames may be aligned. For example, in FIG. 6, the alignment module 132 may align one or more frames with a particular frame such that a pixel is at a same location in each of the frames in the video data 118. In some cases, the alignment module 132 may align frames within each segment while not aligning frames in different segments.

At 912, a high resolution image may be created by combining two or more exemplar frames. At 914, optical character recognition may be performed on each high resolution image. For example, in FIG. 8, the frames 702, 704, and 706 may be combined to create the high resolution image 804 and the OCR module 136 may perform optical character recognition on the high resolution image 804 to create OCR content corresponding to each page (e.g., pair of adjacent pages) in the book.

At 918, OCR may be performed for each of the exemplar frames in each segment. At 920, the OCR result created from performing OCR on each exemplar frame in each segment may be combined to create OCR content corresponding to each page (e.g., pair of adjacent pages) in the book. For example, in FIG. 7, the OCR module 136 may perform optical character recognition on each of the frames 702, 704, and 706 to produce the OCR results 708, 710, and 712, respectively. The OCR module 136 may combine the OCR results 708, 710, and 712 to create the OCR content 722 that corresponds to the page 504.

The techniques described in 912, 914 and 916, 918 may, in some implementations, be used together. For example, if performing OCR on each exemplar frame (e.g., 918, 920) yields more than a threshold number of suspect words, then the exemplar frames may be combined to create a high resolution image and OCR may be performed on the high resolution image (e.g., 912, 914). As another example, if there are more than a threshold number of exemplar frames in a segment, the exemplar frames may be combined to create a high resolution image and OCR may be performed on the high resolution image (e.g., 912, 914) to reduce the number of frames on which OCR is performed. In this example, if there are no more than the threshold number of exemplar frames in a segment, then OCR may be performed on each exemplar frame (e.g., 918, 920).

At 916, an eBook may be created. For example, in FIG. 1, the eBook creation module 142 may perform a structural analysis and logical analysis of the OCR content. The eBook creation module 142 may format the OCR content based on the structural analysis and logical analysis to create the eBook 144. For example, the eBook creation module 142 may identify lines, paragraphs, blocks of text, tables, chapters, sections, and the like using the structural analysis and the logical analysis. The eBook creation module 142 may format the OCR content into lines, paragraphs, blocks of text, tables, chapters, sections and add headers, footers, chapter headings, different font sizes and other formatting. The eBook 144 may be a digital representation that corresponds to the book 116.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
under control of one or more processors configured with executable instructions to perform acts comprising:
receiving a video comprising a plurality of frames, the video including images of pages in a book being turned;
dividing the plurality of frames into one or more segments, each segment of the one or more segments associated with a pair of adjacent pages of the book;
determining one or more exemplar frames in each segment of the one or more segments, each of the one or more exemplar frames including non-redundant data as compared to other frames in each segment, the non-redundant data in each exemplar frame comprising data that is:
associated with at least a portion of the pair of adjacent pages, and
not found in other frames in each segment;
in each segment, performing optical character recognition (OCR) on each of the one or more exemplar frames to create one or more OCR results; and
based at least in part on processing the one or more OCR results in each segment, creating OCR content for each pair of adjacent pages in the book.

2. The method of claim 1, wherein the dividing the plurality of frames in the video into one or more segments comprises:
determining one or more page-turn events in the video; and
dividing the plurality of frames in the video into the one or more segments based on the one or more page-turn events.

3. The method of claim 2, wherein the one or more page-turn events in the video are determined by a classifier that is trained using a set of training data to identify the one or more page-turn events.

4. The method of claim 3, wherein the classifier is based on at least one of a support vector machine, an artificial neural network, or a Bayesian network.

5. The method of claim 1, wherein the acts further comprise:
identifying a content portion of each of the plurality of frames; and
cropping at least one frame of the plurality of frames to include the content portion.

6. The method of claim 1, wherein before performing the OCR on each of the one or more exemplar frames the acts further comprise:
selecting an exemplar frame from the one or more exemplar frames in each segment; and
in each segment, aligning a remainder of the one or more exemplar frames with the selected exemplar frame.

7. The method of claim 1, wherein performing the OCR on each of the one or more exemplar frames comprises:
performing the OCR on each of the one or more exemplar frames;
determining whether the one or more exemplar frames include a suspect word;
creating a plurality of hypotheses for the suspect word;
ranking the plurality of hypotheses for the suspect word; and
selecting a hypothesized word to be substituted for the suspect word from the plurality of hypotheses based on the ranking.

8. A server comprising:
one or more processors;

one or more computer-readable storage media storing instructions executable by the one or more processors to perform acts comprising:
  receiving a video comprising a plurality of frames, individual frames including at least a portion of a pair of adjacent pages in a book;
  dividing the plurality of frames into one or more segments based on one or more page-turn events, individual segments of the one or more segments corresponding to a particular pair of adjacent pages in the book
  for the particular pair of adjacent pages in the book:
    selecting exemplar frames from the plurality of frames, individual exemplar frames including greater than a threshold amount of data for the particular pair of adjacent pages in the book as compared to other frames of the page;
    combining the exemplar frames to create a composite image; and
    performing optical character recognition (OCR) on the composite image to create OCR content.

9. The server of claim 8, the acts further comprising:
for the particular pair of adjacent pages in the book:
  performing a physical structure analysis of the OCR content;
  performing a logical structure analysis of the OCR content; and
  formatting the OCR content, based at least in part on the physical structure analysis and the logical structure analysis, to create formatted content.

10. The server of claim 9, the acts further comprising:
creating an electronic book (eBook) based on the formatted content for the particular pair of adjacent pages.

11. The server of claim 8, the acts further comprising:
cropping one or more exemplar frames to exclude extraneous content based on determining that the one or more exemplar frames include the extraneous content.

12. The server of claim 8, the acts further comprising:
determining whether a pixel in a first exemplar frame is in a different position in a second exemplar frame of the one or more exemplar frames; and
aligning the second exemplar frame such that the pixel is in a same position in the second exemplar frame based on determining that the pixel is in the different position in the second exemplar frame.

13. The server of claim 8, the acts further comprising:
determining the one or more page-turn events in the video using a trained classifier.

14. One or more non-transitory computer-readable storage media storing instructions that are executable by one or more processors to perform acts comprising:
  receiving a video comprising a plurality of frames, the video capturing pages in a book being turned;
  determining, at least one page-turn event depicting a transition from a previous page to a next page in the book;
  dividing the plurality of frames into multiple sets of frames based on the at least one page-turn event, each set of frames of the multiple sets of frames corresponding to a pair of adjacent pages in the book; and
  performing optical character recognition (OCR) on a subset of the frames in each of the multiple sets of frames to create OCR content corresponding to each pair of adjacent pages in the book.

15. The one or more non-transitory computer-readable storage media of claim 14, wherein:
  the subset of the frames comprises exemplar frames from each of the multiple sets of frames; and
  each exemplar frame in a set of frames including non-redundant data, relative to other frames in the set of frames, of the corresponding pair of adjacent pages in the book.

16. The one or more non-transitory computer-readable storage media of claim 14, wherein, before the performing the OCR, the acts further comprise:
  identifying one or more frames of the plurality of frames that include extraneous content; and
  cropping the one or more frames to create cropped frames that exclude the extraneous content.

17. The one or more non-transitory computer-readable storage media of claim 14, wherein, before performing the OCR, the acts further comprise:
  determining that a pixel is located in a first position in a first frame of the plurality of frames;
  determining that the pixel is located in a second position in a second frame of the plurality of frames; and
  aligning the second frame with the first frame.

18. The one or more non-transitory computer-readable storage media of claim 17, wherein aligning the second frame with the first frame comprises at least one of:
  repositioning the second frame such that the pixel is in the first position in the second frame; or
  repositioning the first frame such that the pixel is in the second position in the first frame.

19. The one or more non-transitory computer-readable storage media of claim 14, wherein performing the OCR comprises:
  performing the OCR for each frame in each subset of the frames in each of the multiple sets of frames; and
  combining the OCR associated with each subset of the frames to create the OCR content.

20. The one or more non-transitory computer-readable storage media of claim 14, wherein performing the OCR comprises:
  combining each frame in each subset of the frames to create a composite image corresponding to each pair of adjacent pages in the book; and
  performing the OCR on each composite image to create the OCR content.

* * * * *